United States Patent
Jain et al.

(10) Patent No.: US 9,256,335 B2
(45) Date of Patent: Feb. 9, 2016

(54) INTEGRATED RECEIVER AND ADC FOR CAPACITIVE TOUCH SENSING APPARATUS AND METHODS

(71) Applicant: Texas Instruments Incorporated, Dallas, TX (US)

(72) Inventors: Karan Singh Jain, Dallas, TX (US); Harish Venkataraman, Wylie, TX (US); Susan Curtis, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/531,408

(22) Filed: Nov. 3, 2014

(65) Prior Publication Data
US 2015/0130755 A1   May 14, 2015

Related U.S. Application Data

(60) Provisional application No. 61/901,807, filed on Nov. 8, 2013.

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01)

(58) Field of Classification Search
CPC ... G06F 3/0412; G06F 3/0416; G06F 3/0488; G06F 3/044
See application file for complete search history.

(56) References Cited

U.S. PATENT DOCUMENTS

| | | | | |
|---|---|---|---|---|
| 6,789,030 B1 * | 9/2004 | Coyle | ..................... | G01D 9/005 702/182 |
| 2004/0095111 A1 * | 5/2004 | Kernahan | .............. | H02M 3/157 323/282 |
| 2004/0095113 A1 * | 5/2004 | Kernahan | .............. | H02M 3/157 323/282 |
| 2004/0095116 A1 * | 5/2004 | Kernahan | .................. | G06F 1/24 323/282 |

(Continued)

OTHER PUBLICATIONS

Texas Instruments, Inc., TouchPath Capacitive Touch Screen Controller TSC3060, www.ti.com, SBAS575A, Nov. 2012, Revised Jan. 2013, pp. 1-48, product data sheet, retrieved from world wide web, uniform resource locator: http://www.ti.com/lit/an/sbas575a/sbas575a.pdf, on Oct. 28, 2014.

(Continued)

*Primary Examiner* — Ricardo L Osorio
(74) *Attorney, Agent, or Firm* — Michael A. Davis, Jr.; Frank D. Cimino

(57) ABSTRACT

An integrated analog data receiver for a capacitive touch screen. An analog data receiver circuit for a touch screen device is provided including a sigma delta analog to digital converter configured for direct connection to an analog output of a touch screen device, and further including an integrator circuit having an input coupled for receiving the analog output signal and outputting an integrated output voltage; a comparator coupled to the integrated output voltage and a first bias voltage and outputting a comparison voltage; a clocked sampling latch coupled to the comparison voltage and to a clock signal and outputting quantized data bits corresponding to samples of the comparison voltage; and a digital filter and decimator coupled to the clocked sampling latch and outputting serial data bits which form a digital representation corresponding to the output of the touch screen device. Additional circuits and systems are disclosed.

20 Claims, 7 Drawing Sheets

(56) References Cited

U.S. PATENT DOCUMENTS

2004/0095264 A1* 5/2004 Thomas ................ H02M 3/157
  341/53
2014/0028605 A1 1/2014 Luo et al.

OTHER PUBLICATIONS

Wikipedia, Capacitive Sensing, Heron, Juan M.Gonzalez, et al, retrieved from world wide web, uniform resource locator:http://en.wikipedia.org/wiki/Capacitive_sensing; on Oct. 28, 2014.

* cited by examiner

INTEGRATED RECEIVER AND ADC FOR CAPACITIVE TOUCH SENSING APPARATUS AND METHODS

RELATED APPLICATIONS

This patent application claims priority to U.S. Provisional Application Ser. No. 61/901,807, entitled "Integrated Receiver ADC Architecture for Capacitive Touch Screen Sensing," filed Nov. 8, 2013, which is hereby incorporated by reference herein in its entirety.

TECHNICAL FIELD

Aspects of the present application relate generally to the use of capacitive touch sensing for touch screens as input devices. Applications of capacitive touch screen devices for input include portable devices such as cell phones, smartphones, tablet computers, laptop computers, and the like, as well as personal computers. Additional applications of touch screens include input interfaces to consumer devices and industrial devices having touch screen displays and input panels.

BACKGROUND

In a system that uses a touch screen that combines user input and display functions, projective capacitive touch screens are increasingly used. These touch screens do not require pressure or even actual contact to detect a finger used to indicate an input at a location on a two dimensional touch screen. The use of projective capacitive touch screens on smartphones and tablet devices has increased markedly in recent years. These touch screen devices can also be used in many other applications.

In a projective capacitive touch screen display, in one known approach, a grid of conductors are formed with rectangular conductors spaced from one another by a dielectric. A capacitance is formed at each grid intersection by the presence of two plates (the conductor material) spaced by a dielectric. In a touch screen display, the conductive network overlies a display device such as an LED/LCD display, and icons or symbols may be displayed to indicate different actions that can be taken in response to a selection by a user, for example. The touch screen therefore needs to be transparent to allow the user to view the underlying display. Indium Tin Oxide (ITO) touch screens are often used because this conductive material provides the needed transparency. Other conductive materials may be used. A protective layer such as a glass or similarly hard and transparent material is provided over the touch screen. When a conductive second element, such as a human finger, approaches the touch screen the capacitance in the area where the touch is occurring changes (a finger or conductive stylus which creates a parallel capacitive element proximate to the node), and this change can be detected by circuitry coupled to the touch screen to indicate a touch at a specific location. Using this information, a processor can then determine what action is to be taken. For a few non-limiting examples, in a smartphone or tablet device, the processor can launch an application, start or stop a process, input a number that has been touched, or change the display to another screen to reflect the user's input.

FIG. 1 depicts in a simple block diagram a device 10 such as a smartphone or tablet computer presented to illustrate an application for a projective capacitive touch screen. In device 10, a body or chassis 11 supports a touch screen display 13. The device 10 is not limited to smartphones and tablet computers; device 10 can be any device where a user interface using touch can be utilized. Examples include, without limiting the scope of the present application, industrial controls, consumer controls such as thermostats, security alarms, door openers, home lighting, sound systems, video systems, medical devices such as monitors and testers, portable devices such as pagers, music players, video players, fitness monitors, timekeeping devices, radios, stereos, televisions, set top boxes, laptop and "convertible" personal computers, desktop computers, workstations, and the like.

FIG. 2 illustrates a portion of a touch screen device 100 in operation. In FIG. 2, finger 110 is shown touching the surface 112 of a touch screen device 100. The protective screen 108, which may be glass, sapphire glass, or another transparent layer such as polycarbonate that provides mechanical and moisture protection, is touched. Conductor 102 forms a first plate of the capacitor Cp, the panel capacitor at that location. Conductor 104 provides a second plate. The insulating layer 106 spaces the two conductor layers and forms the dielectric for the capacitor Cp. As can be seen in FIG. 2, as the finger 110 (which can also be, for example, a conductive stylus or similar tool) makes contact or almost makes contact with the surface 112, the capacitor Cf is placed in parallel with the capacitor Cp and this changes the capacitance at the location where the touch occurs. A touch screen panel can have tens, hundreds or thousands of the capacitors Cp in an array across the panel. The array of nodes is used to provide an accurate location for the touch, so that the correct location is determined for use by the system.

FIG. 3 depicts a prior known solution for receiving the output of a touch screen panel and for providing a digital data output DO for use by a system 300 that includes the touch screen panel 301.

In FIG. 3, a portion of a touch screen panel 301 that senses the capacitance change on sense capacitor C0 has an output labeled 'e' that is coupled to an analog data receiver 310. The analog to data receiver circuit 310 can be implemented as one or more monolithic integrated circuits. In a known prior solution, the circuit 310 is coupled to the panel 301 by a ribbon cable or flex cable connection (not shown) which adds resistance to the system 300. If monolithic integrated circuits are not used, off-the-shelf and/or discrete components can be used instead on a board such as a printed circuit board (PCB) or module to form circuit 310.

In the analog data receiver circuit 310, the first stage 303 implements a trans-impedance amplifier (TIA) and the second stage 305 implements, in this illustrative and non-limiting example, a Sallen-Key band pass filter. The output Vout is an analog voltage that is then converted by an analog to digital converter 311 (ADC) to a digital representation of the input signal 'e'. The digital data outputs DO are then available for further processing by the system.

In operation, the sense capacitor C0 receives as an input a time varying voltage Vin such as a sinusoidal stimulus signal. Because the current sourced from a capacitor is equal to the capacitance multiplied by the change in voltage, e.g., $dQ/dt = I = C \, dV/dt$, the output 'e' of the sense capacitor C0 from the panel 301 is taken as a current. The trans-impedance amplifier TIA 303 receives the analog current signal and outputs a corresponding voltage signal to the band pass filter 305, and the band pass filter circuit 305 then outputs the voltage Vout to the ADC 311.

The architecture of the analog data receiver 310 (sometimes referred to as an "analog front end" or AFE) has several disadvantages. To illustrate these, some further analysis of the circuitry is needed.

To obtain the maximum signal to noise ratio (SNR) possible, the input voltage Vin may be driven at a full voltage scale. In order to maintain the same voltage domain at the receiver end, the capacitor Cf1 in circuit 303, the TIA circuit, must be less than or equal to the sense capacitor C0. This arrangement attenuates the input signal, as shown in Equation 1:

$$1 = \frac{e}{Vin} = \frac{C0}{Cf1} < 1 \quad \text{Equation 1}$$

The noise factor N.F. of the signal passed into the Sallen-Key filter 305 can be written in terms of the Friis equation for multiple stage amplifiers, as shown in Equation 2:

$$N.F. = F1 + \frac{F2 - 1}{G1} \quad \text{Equation 2}$$

Where F1 is the noise factor of the TIA stage 303, G1 is the gain of the TIA stage 303, and F2 is the noise factor of the second stage 305

The band pass filter nature of the entire system can be expressed as:

$$\frac{Vout}{Vin(Tx[n])} = \frac{sC0Rf1}{(SCfRf1 + 1)} * \left( \frac{\frac{Ks}{C1r1}}{s^2 + s\left(\left(\frac{1}{C1}\right)\left(\left(\frac{1}{R1}\right) + \left(\frac{1}{R2}\right) + \left(\frac{1}{R3}\right)(1-K)\right) + \left(\frac{1}{C2R2}\right)\right) + \left(\frac{R1+R3}{C1C2R1R2R3}\right)} \right) \quad \text{Equation 3}$$

The angular center frequency ω0 that corresponds to the bandwidth being passed by the system is given by Equation 4:

$$\omega 0 = \sqrt{\frac{(R1 + R3)}{C1C2R3R1R2}} \quad \text{Equation 4}$$

The bandwidth for the system is given by Equation 5:

$$B.W. = \left(\frac{1}{C1}\right)\left(\left(\frac{1}{R1}\right) + \left(\frac{1}{R2}\right) + \left(\frac{1}{R3}\right)(1-K)\right) + \left(\frac{1}{C2R2}\right) \quad \text{Equation 5}$$

The Gain for the system is given by Equation 6:

$$\text{Gain} = \frac{KC0}{C1R1B.W.Cf} \quad \text{Equation 6}$$

In considering the performance of the overall system, it can be seen from examining Equations 3 and 5 above that the bandwidth B.W. and the peak frequency ω0 depend on the values of discrete components C1, C2, R2, R1, and R3, whereas the gain depends on K, C0 and inversely depends on C1, R1, B.W. and Cf, as given by Equation 6.

In order to increase the gain of the system, K (the gain of the op amp 309) can be increased as seen in Equation 6. However, if K is increased significantly, the band pass filter may enter an instability region, for example it may begin to oscillate. Therefore K should be limited in order to avoid instability or oscillation. The total harmonic distortion (THD) will also increase as K increases. This limits the ability of the circuit designer to increase the gain.

The analog data receiver topology of the known prior solution analog data receiver 310 that is illustrated in FIG. 3 also requires a high number of passive components, including 6 resistors, 3 capacitors, and 2 active analog amplifiers. Then, to finally obtain a digital output, the prior known solution also requires an additional analog to digital converter (ADC) following the analog amplifiers. This circuit topology makes integration of the analog data receiver 310 in a monolithic integrated circuit difficult. Depending on the semiconductor technology node used to manufacture the integrated circuits, multiple integrated circuits can be required to implement the amplifiers and passive components and to then form the analog to digital converter 311 to complete the analog receiver solution for the touch screen. Further, it may not be possible to form multiple signal channels on a single integrated circuit using these prior known approaches.

The use of the large number of passive components on such an integrated circuit makes process tolerances in semiconductor manufacturing difficult, as each of the passive components has to be formed with a precise value. As is known to those skilled in the art, when a circuit has a low tolerance to process and temperature dependent device variations, semiconductor manufacturing yields are lowered and costs therefore increase for the good devices that are produced. Even after the analog receiver data 310 is provided, additional components that process the digital signals are still needed to complete the overall solution, requiring still further circuitry. The silicon area needed to implement the many passive components in analog data receiver 310 makes further integration with the ADC 311 or with other functions difficult, increasing board area and increasing the total number of integrated circuits needed to complete a system with a touch screen display.

Improvements are therefore needed in the analog data receiver circuitry for touch screen devices, such as for the analog front end of touch screen systems, in order to address the deficiencies and the disadvantages of the prior known approaches. Solutions are needed that reduce the number of passive components, reduce the active analog circuitry, increase tolerances to process and temperature device variation, and which improve the performance and increase the level of integration of the circuits.

SUMMARY

Various aspects of the present application provide novel analog data receiver circuitry for capacitive touch screen devices with novel circuit topologies that integrate the ADC and analog data receiver circuit functions together.

In one aspect of the present application, an analog data receiver circuit for a touch screen device includes a sigma delta analog to digital converter configured for direct connection to an analog output signal of a touch screen device, and further includes: an integrator circuit having an input coupled for receiving the analog output signal from the touch screen device and outputting an integrated output voltage; a comparator coupled to the integrated output voltage and a first bias voltage and outputting a comparison voltage; a clocked sampling latch coupled to the comparison voltage and to a clock signal and outputting quantized data bits corresponding to samples of the comparison voltage; and a digital filter and decimator coupled to the output of the clocked sampling latch and outputting serial data bits which form a digital representation corresponding to the analog output signal of the touch screen device.

In another aspect of the present application, the analog data receiver circuit is provided wherein the integrator circuit further includes: an operational amplifier having a positive input terminal coupled to a bias voltage, and a negative input terminal coupled to the analog output signal and outputting the integrated voltage output; a capacitor coupled in a feedback path from the integrated voltage output to the negative input terminal; and a resistor coupled in parallel and in the feedback path from the integrated voltage output to the negative input terminal.

In yet another aspect of the present application, the analog data receiver circuit described above further includes a summing node at the input to the integrator circuit and coupled to the analog output signal; and a feedback path coupling an inverted analog feedback voltage to the summing node.

In yet another aspect of the present application, the analog data receiver circuit described above further includes a buffer in the feedback path coupled to receive the output of the clocked sampling latch and outputting the analog feedback voltage to the summing node.

In still another aspect of the present application, the analog data receiver circuit disclosed above further including: a resistor coupled in the feedback path and disposed between the buffer and the summing node. In a further aspect of the present application, in the analog data receiver circuit described above, the buffer performs a digital to analog conversion, and the analog feedback voltage has a level corresponding to a voltage represented by the serial data bits output by the clocked sampling latch.

In yet another aspect of the present application, in the analog data receiver circuit disclosed above, the comparator further includes: an operational amplifier having a positive input terminal coupled to the output of the integrator circuit; and a negative input terminal of the operational amplifier coupled to a bias voltage.

In still another aspect of the present application, in the analog data receiver circuit described above, the clocked sampling latch further comprises an edge triggered data flip flop.

In yet another additional aspect of the present application, the analog data receiver disclosed above is provided, wherein the decimator takes samples of the quantized data bits output by the clocked sampling latch and outputs a number of digital data bits lower than the number of quantized data bits.

In yet another alternative aspect of the present application, the analog data receiver described above is provided wherein the filter performs a digital band pass filtering of the serial data output by the clocked sampling latch.

In still another aspect of the present application, an integrated analog data receiver circuit for a touch screen device includes: a plurality of inputs configured to receive analog sense outputs of a touch screen device; a plurality of analog data receiver circuits, each of the plurality of analog data receiver circuits coupled to at least one of the plurality of inputs, and each further includes a sigma delta analog to digital converter further comprising: an integrator circuit having an input directly receiving an analog sense output from at least one of the plurality of inputs and outputting an integrated output voltage; a comparator coupled to the integrated output voltage and coupled to a first bias voltage and outputting a comparison voltage; a clocked sampling latch coupled to the comparison voltage and to a clock signal and outputting quantized data bits corresponding to samples of the comparison voltage; and a digital filter and decimator coupled to the output of the clocked sampling latch and outputting serial data bits forming a digital representation corresponding to one of the analog sense outputs.

In another alternative aspect of the present application, in the integrated analog data receiver circuit described above, within each of the sigma delta analog to digital converters, the integrator circuit further comprises an operational amplifier having a positive input terminal coupled to a bias voltage, and a negative input terminal coupled to the analog sense output signal and outputting the integrated voltage output; a capacitor coupled in a feedback path from the integrated voltage output to the negative input terminal; and a resistor coupled in parallel with the capacitor in the feedback path from the integrated voltage output to the negative input terminal.

In yet another aspect of the present application, in the integrated analog data receiver circuit described above, wherein: within each of the sigma delta analog to digital converters, each of the comparators further comprise an operational amplifier having a positive input terminal coupled to the integrated voltage output of a corresponding integrator circuit; and a negative input terminal of the operational amplifier coupled to a bias voltage.

In still another additional aspect of the present application, in the integrated analog data receiver circuit described above, wherein: within each of the sigma delta analog to digital converters, each of the decimators sample the quantized data bits output by a corresponding clocked sampling latch and each decimator subsequently outputs a number of digital data bits that is lower than the number of quantized data bits sampled.

In still another additional aspect of the present application, in the integrated analog data receiver circuit described above, wherein: within each of the sigma delta analog to digital converters, the clocked sampling latch further comprises an edge triggered data flip flop.

In yet another aspect of the present application, in the integrated analog data receiver circuit described above, wherein each of the sigma delta analog to digital converters further comprises: a summing node at the input to the integrator circuit; and a feedback path coupling an inverted analog feedback voltage to the summing node.

In another aspect of the present application, a system for receiving user inputs from a touch screen device is provided that includes: a touch screen device configured to transmit analog output signals corresponding to touches detected on a capacitive touch sensitive surface of the touch screen device; a touch screen controller circuit that is integral with the touch screen device, including a plurality of analog data receiver circuits, each of the plurality of analog data receiver circuits coupled to at least one of the analog output signals, and each further comprising: a sigma delta analog to digital converter further comprising: an integrator circuit having an input coupled for receiving an analog signal directly from at least one of the analog output signals and outputting an integrated output voltage; a comparator coupled to the integrated output voltage and coupled to a first bias voltage and outputting a comparison voltage; a clocked sampling latch coupled to the comparison voltage and to a clock signal and outputting quantized data bits corresponding to samples of the comparison voltage; and a digital filter and decimator coupled to the output of the clocked sampling latch and outputting serial data bits forming a digital representation corresponding to an analog signal at the input; and a digital processing circuit coupled to receive the serial data bits as input data and configured to perform defined functions responsive to the touches detected on the touch screen device.

In yet another aspect of the present application, in the system described above, wherein the touch screen controller circuit comprises a monolithic integrated circuit including at least the plurality of analog data receiver circuits.

In still another aspect of the present application, the system disclosed above is provided, wherein the touch screen controller circuit comprises a single monolithic integrated circuit including at least the plurality of analog data receiver circuits and the digital processing circuit.

In yet another additional aspect of the present application, the system above is provided, wherein the touch screen device further comprises a device that is one selected from the group consisting essentially of a smartphone, a tablet computer, a music player, a video player, a laptop computer, a desktop computer, a set top box, a consumer appliance, and an industrial control.

Recognition is made in aspects of this application of a solution for a highly integrated analog data receiver circuit for a touch screen device by forming a circuit topology where a sigma delta analog to digital converter is directly connected to the analog output signals of the touch screen device. The novel analog data receiver circuits disclosed use fewer components and eliminate many passive components that were previously used in the prior known solutions, enabling higher levels of integration and more reliable circuit operation and performance.

BRIEF DESCRIPTION OF THE DRAWINGS

For a more complete understanding of the illustrative examples of aspects of the present application that are described herein and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the illustrative example arrangements and are not necessarily drawn to scale.

DETAILED DESCRIPTION

The making and using of example illustrative arrangements that incorporate aspects of the present application are discussed in detail below. It should be appreciated, however, that the illustrative examples disclosed provide many applicable inventive concepts that can be embodied in a wide variety of specific contexts. The specific examples and arrangements discussed are merely illustrative of specific ways to make and use the various arrangements, and the examples described do not limit the scope of the specification, or the scope of the appended claims.

For example, when the term "coupled" is used herein to describe the relationships between elements, the term as used in the specification and the appended claims is to be interpreted broadly, and is not to be limited to "connected" or "directly connected" but instead the term "coupled" may include connections made with intervening elements, and additional elements and various connections may be used between any elements that are "coupled."

In various aspects of the present application, novel solutions are provided to receive the analog output signals from a capacitive touch screen device and to directly perform an analog to digital conversion to obtain digital data corresponding to the analog output signals. In an illustrative arrangement, an analog data receiver includes an analog to digital converter that is directly coupled to the analog output signals from the capacitive touch screen device without intermediate analog stages. This circuit topology is in sharp contrast to the prior known solutions. The use of the novel features advantageously eliminates many passive components which make new highly integrated circuit solutions feasible, as a single integrated circuit can now include the analog and digital portions of a touch screen system with high manufacturing yield and high reliability.

Figure 4:
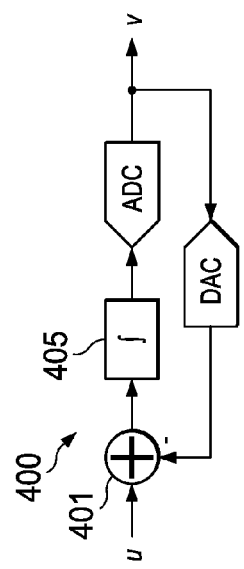
FIG. 4 illustrates in a simplified block diagram a conventional sigma delta analog to digital converter circuit.

In FIG. 4, a block diagram of a conventional sigma delta analog to digital converter 400 is illustrated for the purposes of discussion. In FIG. 4 an analog input signal 'u' is input to a summing node 401 which receives the analog input signal u and subtracts the value of an analog feedback signal supplied from a digital to analog converter labeled "DAC" coupled to the digital output. An integrator 405 receives the difference from the summing node 401 and an analog to digital converter "ADC" converts the integrator 405 output to a digital value 'v' corresponding to the analog input signal 'u'. In a practical system the analog to digital converter ADC may be implemented as a comparator followed by a clocked sampling latch which quantizes the comparator output into a series of serial data bits which, when averaged, form a digital representation corresponding to the analog input signal u. The digital output signal 'v' is also converted back to an analog voltage by the digital to analog converter DAC for the negative feedback path to the summing node 401.

In an aspect of the present application, it has now been surprisingly discovered that a novel analog data receiver for a touch screen circuit can be formed from an analog to digital converter that is directly connected to the capacitive touch screen sense signal outputs, without the use of the intermediate analog stages that are presently required in the known prior approaches. Recognition of certain similarities between the topology of a sigma delta analog to digital converter and the various analog stages of the prior known approach analog circuitry enables the creation of a novel circuit topology for an analog data receiver. The novel analog data receiver uses only a sigma delta analog to digital converter that is directly connected to the analog outputs of the capacitive touch screen device.

Figure 5:
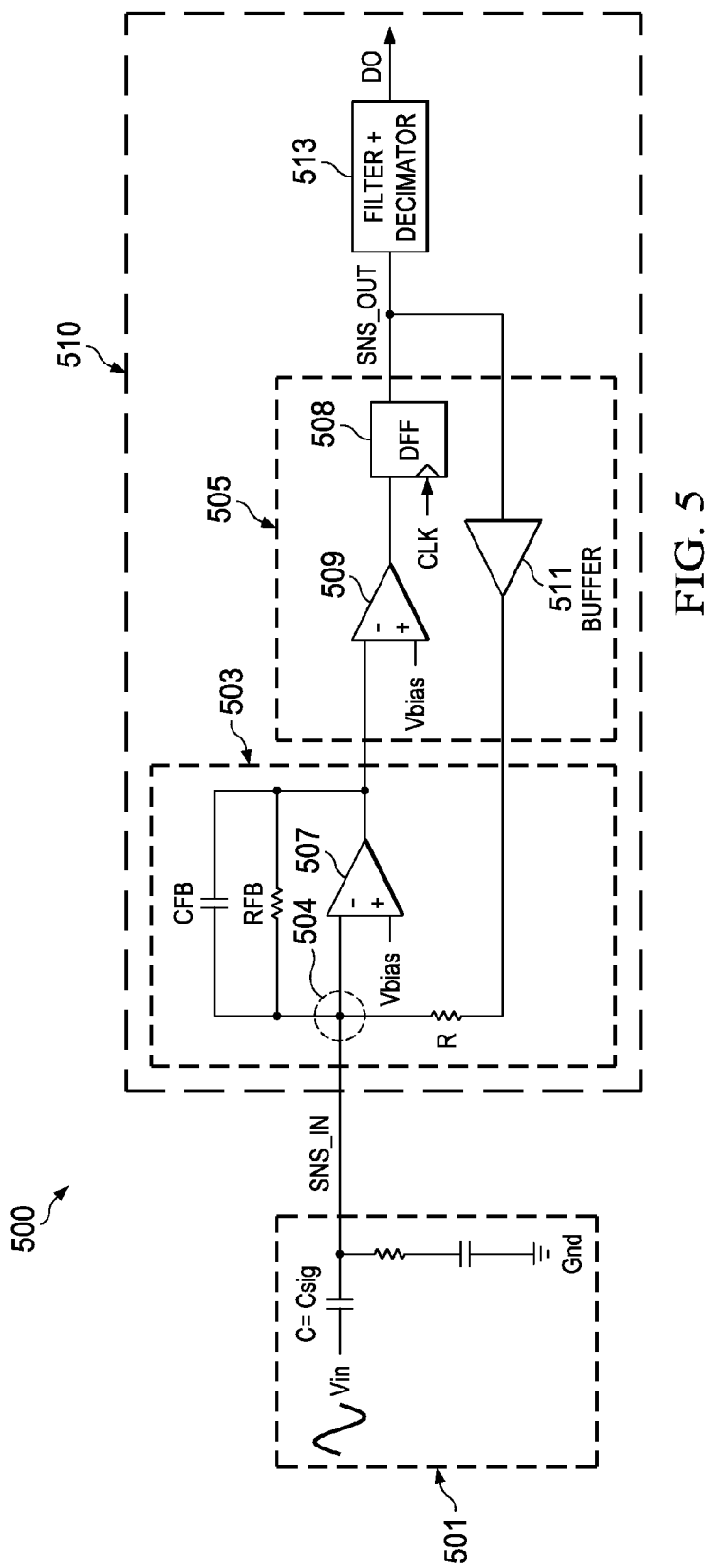
FIG. 5 illustrates in a simplified circuit diagram an example illustrative arrangement of an analog data receiver circuit incorporating features of the present application.

FIG. 5 depicts in an aspect of the present application an illustrative example system 500. In system 500, an analog data receiver 510 is directly connected to an analog sense output signal SNS_IN from a capacitive touch panel 501 with a sense capacitor Csig. In FIG. 5, an integrator 503 is formed by operational amplifier 507 with a bias voltage coupled to a positive input terminal, and a negative input terminal directly coupled to the analog input signal SNS_IN. A feedback path is formed by the feedback resistor RFB and the feedback capacitor CFB, coupled in parallel, and a summing node 504 is formed at the negative input terminal of the operational amplifier 507. The output of the integrator circuit 503 is coupled to the positive input terminal of a comparator circuit 505 formed by operational amplifier 509 and having a voltage bias at the negative input terminal. The output of the comparator 509 is coupled to a clocked sampling latch 508. The output of clocked sampling latch 508 is a series of digital data bits output at the node labeled SNS_OUT output that occur at a frequency that is determined by the sampling clock CLK. A buffer 511 and resistor R form a digital to analog converter in an output feedback path that is coupled to the summing node 504 at the negative input terminal of the operational amplifier 507.

The circuit topology for the novel analog data receiver 510 can be described mathematically as a transfer function:

$$Vout = Vin * 2\pi FstmCsigR \quad \text{Equation 7}$$

Where Fstm is the frequency of the input stimulus signal
The noise transfer function can be expressed as:

$$\text{Noise } Vn1 = Vp * 2\pi FstmCpR \quad \text{Equation 8}$$

Therefore the signal to noise ratio (SNR) for the system of FIG. 5 can be expressed as the ratio of output signal Vout to the noise Vn1 in the frequency range of interest, or:

$$SNR = \frac{Vout}{Vn1} = \frac{VinCsigFstm * \sqrt{3}}{Cp * (\sqrt{Vp^2})(f2^3 - f1^3)} \quad \text{Equation 9}$$

where the frequency f1 is less than the stimulus frequency Fstm, and
frequency f2 is greater than the stimulus frequency Fstm.

As can be seen from Equation 7 above, the system gain can be simply controlled by increasing Vin, by increasing R, and by increasing the stimulus frequency Fstm, giving the circuit designer very flexible options to tailor the performance and gain of the circuit to a particular application.

Figure 3:
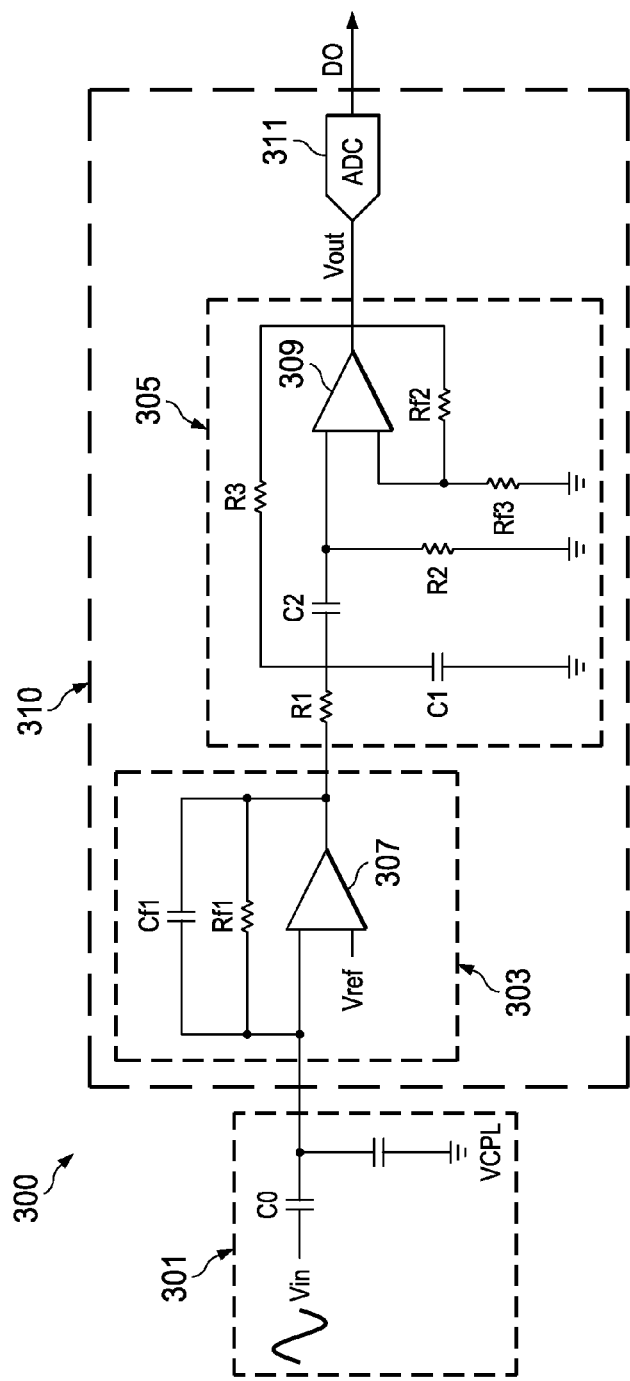
FIG. 3 illustrates in a simplified circuit diagram an analog data receiver circuit of the prior art.

By comparing the circuit topology of the illustrative example analog data receiver 510 of FIG. 5 to the topology of the known prior solution circuit 300 of FIG. 3, it can be observed that the trans-impedance amplifier 303 of the prior art circuit has a topology close to the integrator circuit 503 of FIG. 5. The comparator circuit 505 with operational amplifier 509 and the clocked sampling latch 508 has a circuit topology that is, in some ways, close to the circuit topology of the band pass filter 305 in the prior known solution of FIG. 3. Further, the capacitive touch screen device 501 has a band pass filter nature, so that the touch screen itself can be said to provide pass filtering in the analog signals. Thus by forming the analog data receiver 510 using the novel circuit topology shown in FIG. 5, the illustrative example incorporating aspects of the present application shown in FIG. 5 provides a circuit topology with a two stage amplifier function that, in certain respects, forms a circuit topology near the topology of the prior known solutions, but very importantly the novel analog data receiver 510 is formed while avoiding the use of the many passive components of the prior known solution 310 shown in FIG. 3, and the novel circuit topology of the present application advantageously integrates the analog to digital converter function into the analog data receiver, thereby surprisingly eliminating entirely many active and passive components that are used in the prior known solutions.

Figure 1:
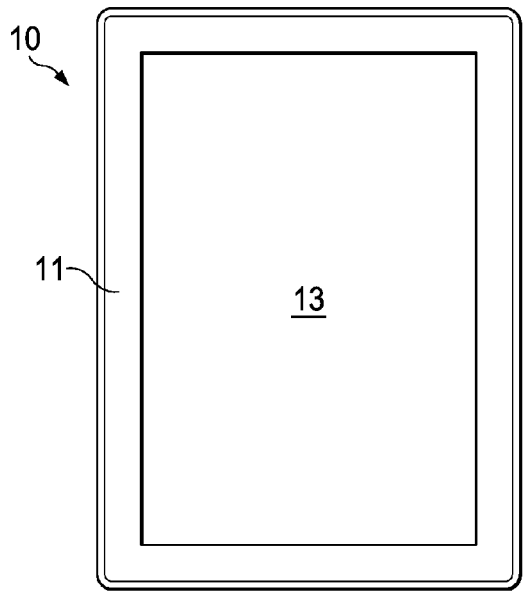
FIG. 1 illustrates in a simplified a touch screen device illustrated for describing various aspects of the present application.
Figure 2:
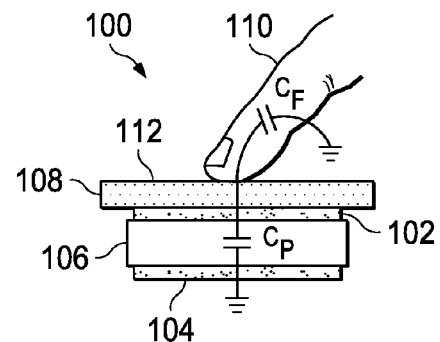
FIG. 2 illustrates in a cross sectional view a portion of a touch screen device in operation.

In operation, the analog data receiver 510 in the system 500 receives the analog input data signal SNS_IN which corresponds to Vin*Csig. This signal corresponds to a change in a capacitance that results when a touch occurs on a touch sensitive panel 501 in FIG. 5. The detected touch can be, as shown in FIG. 2 above, a touch performed by a human finger. Alternatively a conductive stylus or dedicated conductive pointing device can perform the touch, such as are used in a signature panel touch screen display at a point of sale terminal.

The analog input signal SNS_IN is integrated by the integrator circuit 503 and a corresponding integrated output voltage is output to the comparator 505. This output voltage is coupled to the positive input terminal of the operational amplifier 509, which compares the output voltage from the integrator 503 to a bias voltage Vbias at the negative input terminal. The output voltage of comparator 509 is then sampled by the clocked sampling latch 508. In the illustrative and non-limiting example arrangement shown in FIG. 5, the clocked sampling latch 508 is implemented as an edge triggered data flip flop DFF. However, other register types can also be used, and if used in place of the edge triggered data flip flop, these circuits form additional alternative arrangements that are also contemplated herein as aspects of the present application. Two phase clocking schemes can be used as additional alternative arrangements that are also contemplated herein.

The input signal CLK provides the sampling frequency for the edge triggered clocked sampling latch 508. A new data bit will appear on the output of the latch 508 at each rising edge of the CLK signal. The clocked sampling latch 508 thus performs a quantizing function, by sampling the analog output of the comparator 509 to produce quantized sample data. As is known to those skilled in the art, the use of such a quantizer in analog to data converters allows for the use of oversampling; that is, sampling the analog signal at a rate greater than the minimum Nyquist rate needed to reproduce the analog signal. By oversampling, system error due to noise such as quantization noise in the system may be removed or reduced from the digital output by later averaging the samples and by applying digital filtering techniques to the digital data.

The output SNS_OUT from the clocked sampling latch 508 is an oversampled series of quantized data bits. The filter and decimator 513 operates to form a digital representation of the analog input signal SNS_IN by dividing down the number of samples (performing decimation) and the samples SNS_OUT can also be used in band pass filtering in the digital domain. Thus the digital data output at the terminal DO is serial digital data that forms an accurate digital representation of the analog input signal SNS_IN.

The feedback path formed by the buffer 511 and resistor R to the summing node 504 forms a negative feedback path. Summer 504 subtracts an analog signal corresponding to the current quantized output bit from the input signal, thus constantly correcting the output SNS_OUT to track changes in the input signal SNS_IN.

In a novel approach that is an additional aspect of the present application which accrues certain advantages, the analog data receiver 510 integrates the analog functions including and the analog band pass filter of the prior known solution along with the analog to digital converter to produce digital output data. This innovative approach unexpectedly and advantageously eliminates many passive components required by the prior solutions as well as two active operational amplifiers used in the prior solutions. The resulting novel analog data receiver thus requires far less silicon area, and is far more tolerant to process and temperature variations and variations in device size and device operation such as Vt variations, than the circuits used in the prior known approaches. The novel analog data receiver 510 is easily integrated to form a complete system on a chip (SOC) solution for a touch screen controller function, for example. Some example system arrangements that form additional aspects of the present application contemplated by the inventors and which fall within the scope of the appended claims are further described below.

Figure 6:
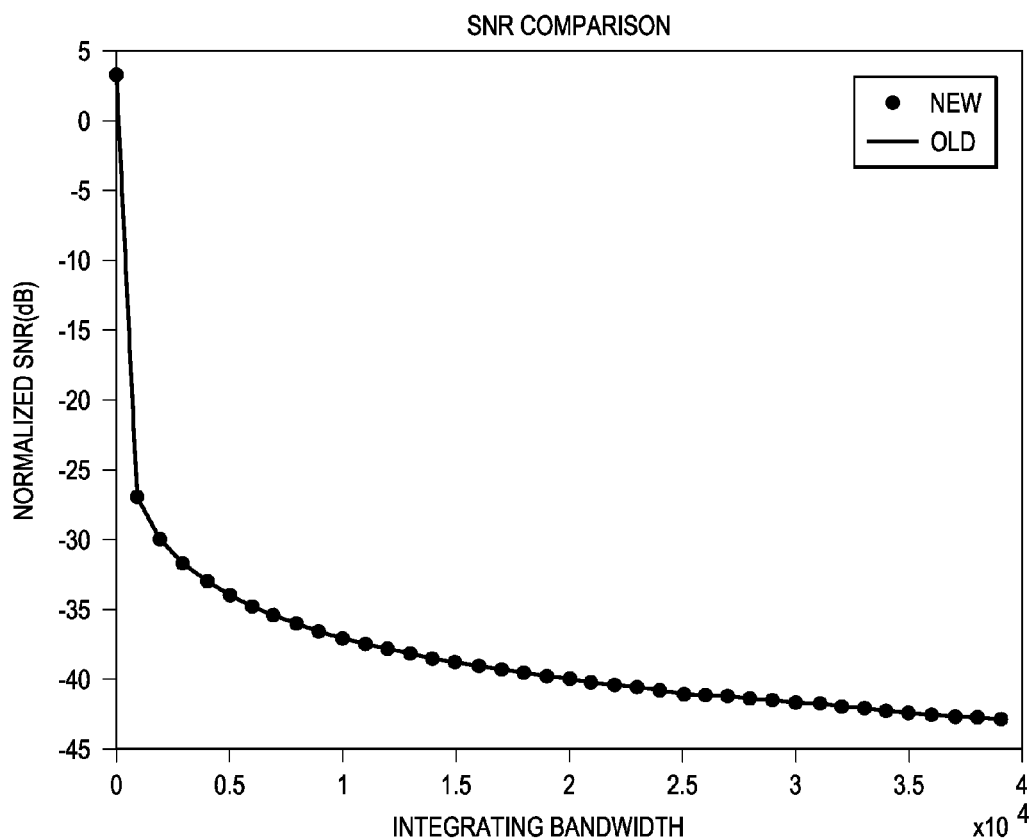
FIG. 6 illustrates in a graph a comparison of the signal to noise ratio of a prior art analog data receiver circuit to the signal to noise ratio obtained using an analog data receiver circuit arrangement incorporating aspects of the present application.

FIG. 6 illustrates the signal to noise performance of an analog data receiver circuit incorporating aspects of the present application by comparing the SNR for the novel analog data receiver circuit, as shown in Equation 9, to the SNR obtained from the prior known solution illustrated in FIG. 3 above. The signal to noise ratio for the prior known solution circuit 310 can be determined for the first amplifier stage 303, the trans impedance amplifier, as:

$$SNR \text{ prior solution} =$$

$$\frac{Vout}{Vnoise} = (VinCsig)/Cp * \sqrt{(Vp2)*(f2-f1)}$$

Equation 10

FIG. 6 depicts in a graph of SNR versus frequency overlying data plots of the SNR obtained for each of the two circuits, the frequency plots of the SNR for novel aspects of the present application (labeled "new") and for the first stage 303 of the prior known approaches (labeled "old").

As can be seen from examining the SNR graph depicted in FIG. 6, the overall SNR function for the novel arrangements that include aspects of the present application such as analog data receiver circuit 510 is shown to have an SNR equivalent to the SNR for just the first stage 303, the trans-impedance amplifier, of the prior known solution 310. Because the second stage of the prior known solution, the Sallen Key band pass filter 305 in FIG. 3, will certainly add more noise to the overall system performance, circuits formed incorporating various aspects of the present application have a noise performance that is at least as good as, and probably substantially better than, the circuits of the prior known approach.

The SNR performance of the example arrangements described thus far considered the illustrative example of the analog data receiver circuit 510 in FIG. 5. However this illustrative example analog data receiver uses a first order sigma delta ADC circuit. By extending the analog data receiver of the illustrative arrangements to be a second order sigma delta ADC circuit, additional improvement in the performance of the systems incorporating aspects of the present application can be attained.

Figure 7:
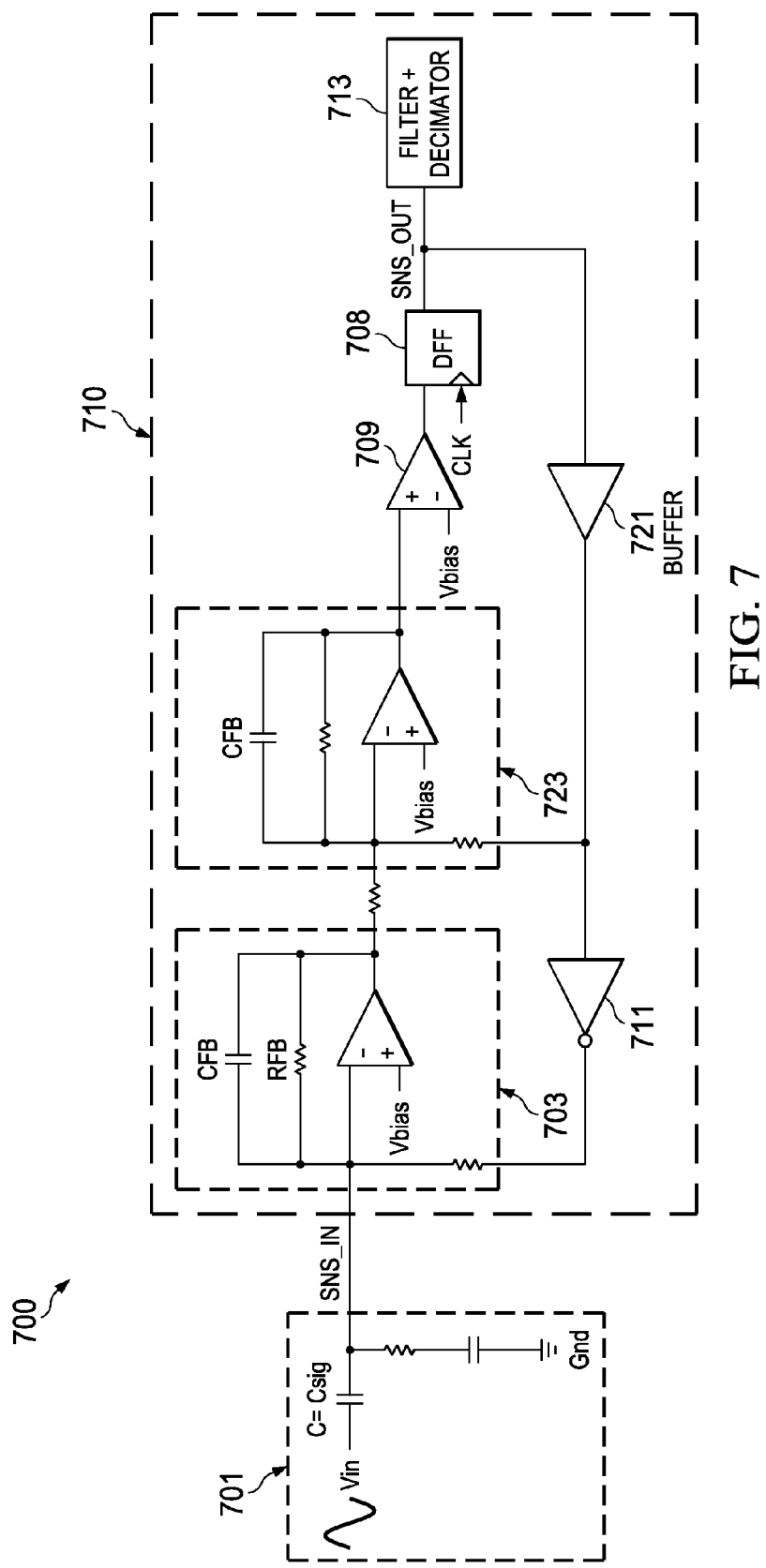
FIG. 7 illustrates in a simplified circuit diagram an alternative arrangement analog data receiver circuit incorporating aspects of the present application and implemented using a second order analog to digital converter.

FIG. 7 depicts, for example, an alternative example arrangement of the novel analog data receiver circuit in a second order circuit topology. In FIG. 7, an illustrative example system 700 includes a touch screen 701 and an analog data receiver 710. The analog data receiver 710 includes a second order sigma delta analog to digital converter. The illustrative example data receiver 710 in FIG. 7 includes the components analogous to the example analog data receiver circuit 510 in FIG. 5, and in addition, adds a second integrator circuit 723 between the first integrator circuit 703 and the comparator 709. As is known to those of skill in the art, the use of the second order sigma delta ADC can improve the ADC circuit performance.

Figure 8A:
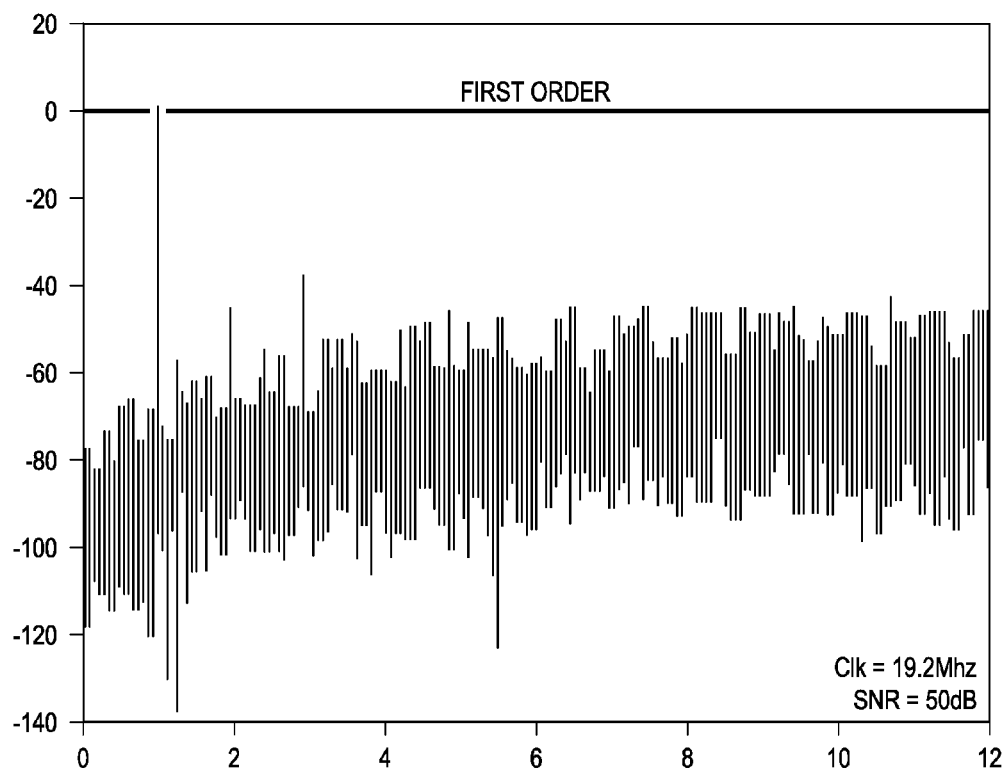
FIG. 8A illustrates in a graph the signal to noise ratio obtained for an example arrangement analog data receiver that incorporates aspects of the present application.
Figure 8B:
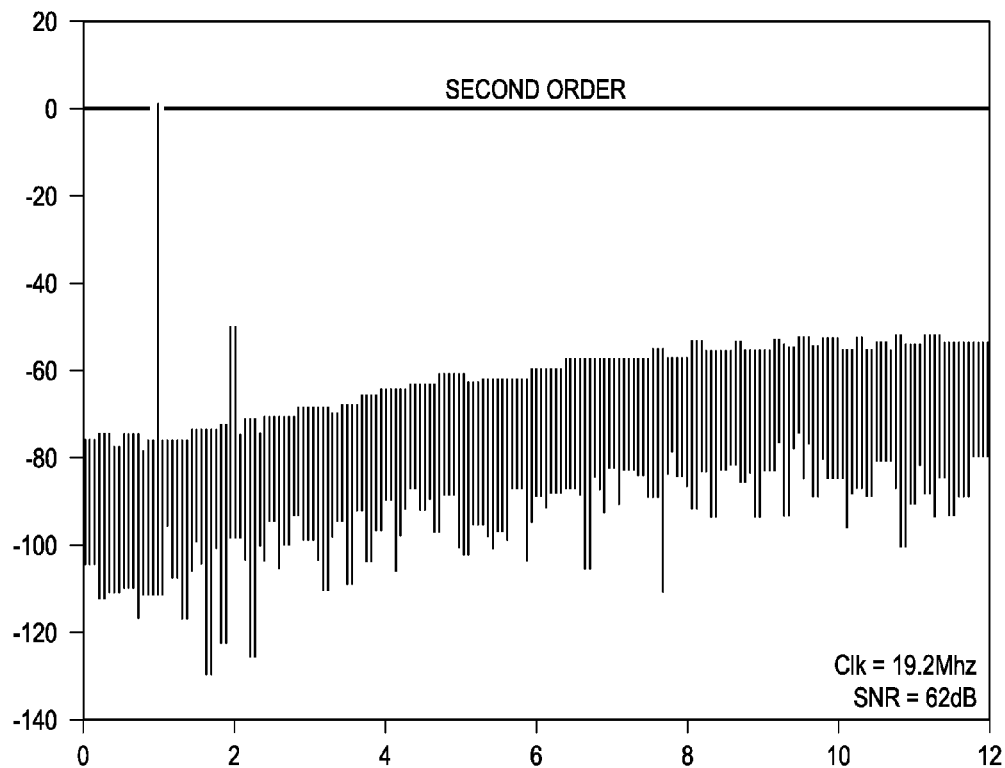
FIG. 8B illustrates in a graph the signal to noise ratio obtained for another example analog data receiver incorporating aspects of the present application.

FIGS. 8A and 8B present, in two graphs, the SNR performance obtained by the example arrangements for the circuits described above. FIG. 8A depicts the SNR obtained for the first order sigma delta ADC arrangement for an analog data receiver as illustrated in FIG. 5. As can be seen from FIG. 8A, the SNR obtained is about 50 dB at a selected clock frequency of 19.2 MHz. The SNR illustrated by the plot in FIG. 8B is for the second order sigma delta ADC analog data receiver in the illustrative example arrangement of FIG. 7, which adds an additional integrator circuit 723 and a second buffer 711 to the first order sigma delta ADC arrangement of FIG. 5. The SNR obtained is even better, as expected, and it can be seen from examining the plot presented in FIG. 8B that the SNR is now 62 dB at the example clock frequency of 19.2 MHz.

Figure 9:
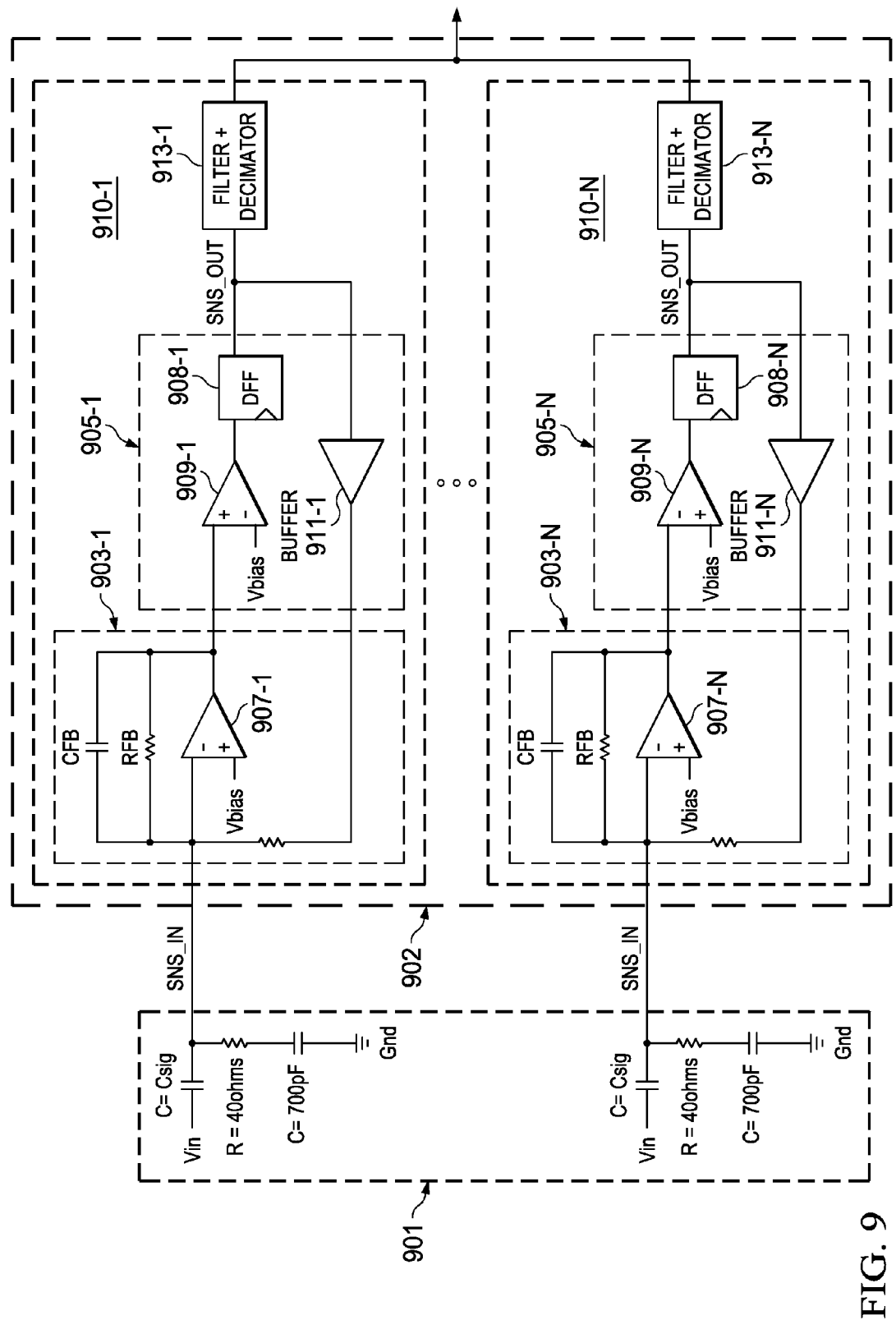
FIG. 9 depicts in a simplified block diagram an integrated circuit including an arrangement including a plurality of analog data receiver circuits each incorporating features of the present application.

FIG. 9 depicts in another block diagram an illustrative example system 900 and an example monolithic integrated analog data receiver circuit 902. In system 900, a touch screen 901 has multiple analog sense outputs corresponding to rows of capacitors used in sense detection. The illustrative example monolithic integrated circuit 902 includes a plurality of the analog data receiver circuits 910-1 to 910-N, such as are illustrated in FIGS. 5 and 7 above, each of these analog data receiver circuits is coupled to one of the analog sense signals.

Because the novel arrangements that are aspects of the present application reduce the silicon area needed for the integrated analog data receiver, and because the novel circuits discovered by the inventors of the present application use fewer passive components for each, the novel monolithic integrated circuit 901 can include several signal channels and provide a single analog data receiver chip for the touch screen 901. Each of the illustrative example circuits 910-1 to 910-N includes a sigma delta analog to digital converter including the integrator circuits, shown as 903-1 to 903-N, coupled directly to analog output signals of the touch screen panel, and the comparator circuits 905-1 to 905-N, and the decimators 913-1 to 913-N. The illustrative example of monolithic integrated circuit 902 has a digital data output for each of the analog sense signals from the touch screen 901.

In yet another alternative arrangement that incorporates certain novel features of the present application, the high level of integration that can be advantageously achieved by use of the example integrated analog data receiver circuits enables the analog data receiver function to be formed integral to the capacitive touch screen panel itself, eliminating the ribbon cable or flex cable connectors used in the prior known solutions, which further reduces costs and which further improves performance by removing resistive elements from the system.

Figure 10:
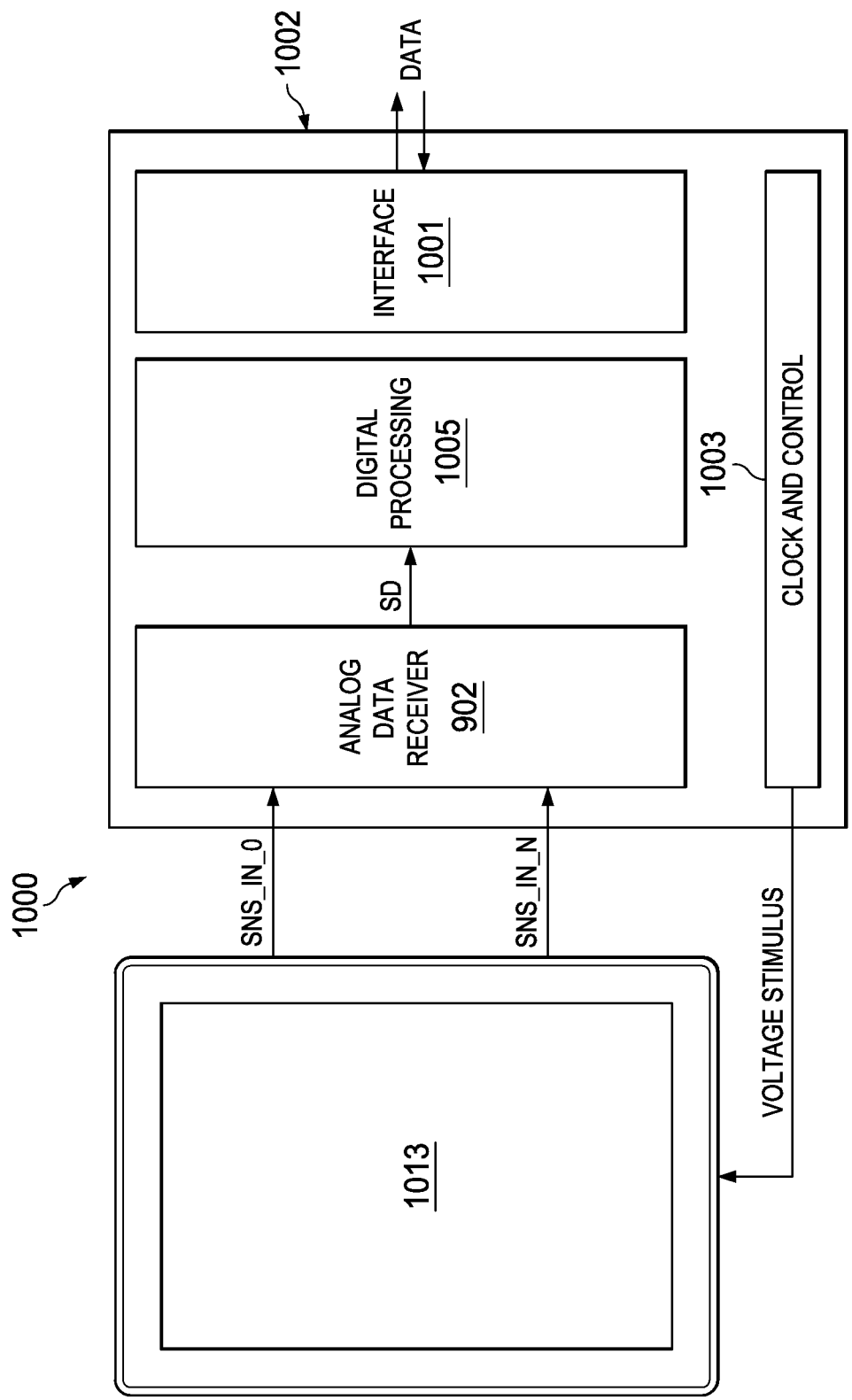
FIG. 10 depicts in a simplified block diagram a system for a touch screen and a touch screen controller integrated circuit incorporating analog data receiver circuits that include various aspects of the present application.

FIG. 10 illustrates an example system 1000 that can advantageously incorporate various features of the present application. In FIG. 10, a printed circuit board, module, or single monolithic integrated circuit 1002 includes the analog data receiver 902 of FIG. 9 described above, for example, and also a digital processing function 1005 for processing the data received from a touch screen display panel 1013. The digital processing block 1005 can be implemented as a digital signal processor or DSP, mixed signal processor or MSP, a microprocessor, a microcontroller, an advanced reduced instruction set machine (ARM), a state machine, and the like. The digital processing function 1005 is coupled to a data output DATA by an interface block 1001. The data interface may implement a serial bus protocol such as I2C, SDI, and the like, for example. A clock and control block 1003 is provided to control timing and provide control signals. A voltage stimulus signal provides the sinusoidal excitation signals needed to drive the Vin signals to the sense capacitors disposed in the touch screen 1013. The touch screen 1013 may be arranged with conductors in rows and columns, the columns for example receiving the sinusoidal excitation signals, and the rows providing the sense output signals. A capacitor is formed at the intersections of the rows and columns for detecting touch on the surface of the touch screen as shown in FIG. 2 above.

The capacitive touch screen device 1013 in FIG. 10 can be part of any device using a touch screen as an input. For example touch screen device 1013 can be, without limitation, a smartphone, tablet computer, laptop computer, personal computer, desktop computer, point of sale terminal, music player, set top box, video player, internet browser, pager, consumer appliance, consumer control such as a thermostat or home security system, and industrial controls.

The illustrative example arrangement circuit 1002 can be implemented as single integrated circuit to form a system on a chip (SOC) touch screen controller. This highly integrated device can perform the analog data receiver functions as well as the digital signal processing required to provide a complete solution for the use of the touch screen device 1013 on a single integrated circuit. In an alternative illustrative arrangement of the present application, a pair of integrated circuits may be provided in a stacked die package to form an SOC or SIP solution. In a stacked die package, a first integrated circuit may include the analog data receiver 902, while a second integrated circuit may include the digital functions such as 1005, 1001, and 1003. Other arrangements including integrated circuits having on-board RAM and on-board non-volatile memory are also contemplated as additional alternative arrangements that incorporate various features of the present application and which accrue significant advantages by use of the various features disclosed herein.

In an example advantageous arrangement incorporating aspects of the present application that provides a space saving solution, the integrated circuit 1002 is provided integrally with the touch screen device 1013, that is, the packaged touch screen device 1013 includes the touch screen controller 1002 without the need for ribbon connectors or flex cables between the devices as was conventionally done. Elimination of these connectors reduces cost, saves space, and improves system performance by eliminating the resistance associated with the physical connectors of the prior known solution.

Although the example illustrative arrangements have been described in detail, it should be understood that various changes, substitutions and alterations can be made herein without departing from the spirit and scope of the present application as defined by the appended claims.

Moreover, the scope of the present application is not intended to be limited to the particular illustrative example arrangement of the process, machine, manufacture, and composition of matter means, methods and steps described in this specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding example arrangements described herein may be utilized according to the illustrative arrangements presented and alternative arrangements described, suggested or disclosed. Accordingly, the appended claims are intended to include within their scope such processes, machines, manufacture, compositions of matter, means, methods, or steps.

What is claimed is:

1. An analog data receiver circuit for a touch screen device, comprising:
    a sigma delta analog to digital converter configured for direct connection to an analog output signal of a touch screen device, and further comprising:
        an integrator circuit having an input coupled for receiving the analog output signal from the touch screen device and outputting an integrated output voltage;
        a comparator coupled to the integrated output voltage and a first bias voltage and outputting a comparison voltage;
        a clocked sampling latch coupled to the comparison voltage and to a clock signal and outputting quantized data bits corresponding to samples of the comparison voltage; and
    a digital filter and decimator coupled to the output of the clocked sampling latch and outputting serial data bits which form a digital representation corresponding to the analog output signal of the touch screen device.

2. The analog data receiver circuit of claim 1, wherein the integrator circuit further comprises:
    an operational amplifier having a positive input terminal coupled to a bias voltage and a negative input terminal coupled to the analog output signal and outputting the integrated voltage output;
    a capacitor coupled in a feedback path from the integrated voltage output to the negative input terminal; and
    a resistor coupled in parallel and in the feedback path from the integrated voltage output to the negative input terminal.

3. The analog data receiver circuit of claim 1, further comprising:
    a summing node at the input to the integrator circuit and coupled to the analog output signal; and
    a feedback path coupling an inverted analog feedback voltage to the summing node.

4. The analog data receiver circuit of claim 3 and further comprising:
    a buffer in the feedback path coupled to receive the output of the clocked sampling latch and outputting the analog feedback voltage to the summing node.

5. The analog data receiver circuit of claim 4 and further comprising:
    a resistor coupled in the feedback path and disposed between the buffer and the summing node.

6. The analog data receiver circuit of claim 5, wherein the buffer performs a digital to analog conversion and the analog feedback voltage has a level corresponding to a voltage represented by the serial data bits output by the clocked sampling latch.

7. The analog data receiver circuit of claim 1, wherein the comparator further comprises:
    an operational amplifier having a positive input terminal coupled to the output of the integrator circuit; and
    a negative input terminal of the operational amplifier coupled to a bias voltage.

8. The analog data receiver circuit of claim 1, wherein the clocked sampling latch further comprises an edge triggered data flip flop.

9. The analog data receiver of claim 1, wherein the decimator takes samples of the quantized data bits output by the clocked sampling latch and the decimator outputs a number of digital data bits lower than a number of quantized data bits.

10. The analog data receiver of claim 1, wherein the filter performs a digital band pass filtering of the serial data output by the clocked sampling latch.

11. An integrated analog data receiver circuit for a touch screen device, comprising:
a plurality of inputs configured to receive analog sense outputs of a touch screen device;
a plurality of analog data receiver circuits, each of the plurality of analog data receiver circuits coupled to at least one of the plurality of inputs, and each further comprising:
a sigma delta analog to digital converter further comprising:
an integrator circuit having an input directly receiving an analog sense output from at least one of the plurality of inputs and outputting an integrated output voltage;
a comparator coupled to the integrated output voltage and coupled to a first bias voltage and outputting a comparison voltage;
a clocked sampling latch coupled to the comparison voltage and to a clock signal and outputting quantized data bits corresponding to samples of the comparison voltage; and
a digital filter and decimator coupled to the output of the clocked sampling latch and outputting serial data bits forming a digital representation corresponding to an analog sense output signal.

12. The integrated analog data receiver circuit of claim 11, wherein within each of the sigma delta analog to digital converters, the integrator circuit further comprises:
an operational amplifier having a positive input terminal coupled to a bias voltage, and a negative input terminal coupled to the analog sense output signal and outputting the integrated voltage output;
a capacitor coupled in a feedback path from the integrated voltage output to the negative input terminal; and
a resistor coupled in parallel with the capacitor in the feedback path from the integrated voltage output to the negative input terminal.

13. The integrated analog data receiver circuit of claim 11, wherein within each of the sigma delta analog to digital converters, each of the comparators further comprise:
an operational amplifier having a positive input terminal coupled to the integrated voltage output of a corresponding integrator circuit; and
a negative input terminal of the operational amplifier coupled to a bias voltage.

14. The integrated analog data receiver circuit of claim 11, wherein within each of the sigma delta analog to digital converters, each of the decimators sample the quantized data bits output by a corresponding clocked sampling latch and each decimator subsequently outputs a number of digital data bits that is lower than a number of quantized data bits sampled.

15. The integrated analog data receiver circuit of claim 11, wherein within each of the sigma delta analog to digital converters, the clocked sampling latch further comprises an edge triggered data flip flop.

16. The integrated analog data receiver circuit of claim 11, wherein each of the sigma delta analog to digital converters further comprises:
a summing node at the input to the integrator circuit; and
a feedback path coupling an inverted analog feedback voltage to the summing node.

17. A system for receiving user inputs from a touch screen device, comprising:
a touch screen device configured to transmit analog output signals corresponding to touches detected on a capacitive touch sensitive surface of the touch screen device;
a touch screen controller circuit that is formed integral with the touch screen device, comprising:
a plurality of analog data receiver circuits, each of the plurality of analog data receiver circuits coupled to at least one of the analog output signals and each further comprising:
a sigma delta analog to digital converter further comprising:
an integrator circuit having an input coupled for receiving an analog signal directly from at least one of the analog output signals and outputting an integrated output voltage;
a comparator coupled to the integrated output voltage and coupled to a first bias voltage and outputting a comparison voltage;
a clocked sampling latch coupled to the comparison voltage and to a clock signal and outputting quantized data bits corresponding to samples of the comparison voltage;
a digital filter and decimator coupled to the output of the clocked sampling latch and outputting serial data bits forming a digital representation corresponding to an analog signal at the input; and
a digital processing circuit coupled to receive the serial data bits as input data and configured to perform defined functions responsive to the touches detected on the touch screen device.

18. The system of claim 17, wherein the touch screen controller circuit comprises a monolithic integrated circuit including at least the plurality of analog data receiver circuits.

19. The system of claim 18, wherein the touch screen controller circuit comprises a single monolithic integrated circuit including at least the plurality of analog data receiver circuits and the digital processing circuit.

20. The system of claim 17, wherein the touch screen device further comprises a device that is one selected from the group consisting essentially of a smartphone, a tablet computer, a music player, a video player, a laptop computer, a desktop computer, a consumer appliance, and an industrial control.

* * * * *